US009950560B2

United States Patent
Boháč et al.

(10) Patent No.: US 9,950,560 B2
(45) Date of Patent: Apr. 24, 2018

(54) VIBRATION AND NOISE DAMPER

(71) Applicant: BONATRANS GROUP a.s., Bohumin (CZ)

(72) Inventors: Tomás Boháč, Metylovice (CZ); Marek Firczyk, Horní Suchá (CZ); Hubert Tasek, Bohumin (CZ)

(73) Assignee: BONATRANS GROUP A.S. (CZ)

( * ) Notice: Subject to any disclaimer, the term of this patent is extended or adjusted under 35 U.S.C. 154(b) by 0 days.

(21) Appl. No.: 15/030,225

(22) PCT Filed: Oct. 17, 2014

(86) PCT No.: PCT/CZ2014/000116
§ 371 (c)(1),
(2) Date: Apr. 18, 2016

(87) PCT Pub. No.: WO2016/058562
PCT Pub. Date: Apr. 21, 2016

(65) Prior Publication Data
US 2016/0297238 A1    Oct. 13, 2016

(30) Foreign Application Priority Data
Oct. 17, 2013  (CZ) .................................. 2013-798

(51) Int. Cl.
*F16F 15/12* (2006.01)
*F16F 15/129* (2006.01)
(Continued)

(52) U.S. Cl.
CPC ...... *B60B 17/0024* (2013.01); *B60B 17/0031* (2013.01); *F16F 15/1207* (2013.01);
(Continued)

(58) Field of Classification Search
CPC ......... F16F 15/00; F16F 15/129; B60B 17/00; B60B 17/0024
(Continued)

(56) References Cited

U.S. PATENT DOCUMENTS 1,765,477 A * 6/1930 Ackerman .......... B60B 17/0017
105/130
2,646,308 A * 7/1953 Antonio .............. B60B 17/0041
152/41
(Continued)

FOREIGN PATENT DOCUMENTS

AT   385 002       2/1988
DE   298 07 872 U1 9/1998
(Continued)

OTHER PUBLICATIONS

International Search Report dated Apr. 1, 2015 issued in corresponding International patent application No. PCT/CZ2014/000116.
(Continued)

*Primary Examiner* — Bradley T King
*Assistant Examiner* — James K Hsiao
(74) *Attorney, Agent, or Firm* — Ostrolenk Faber LLP (57) ABSTRACT

A vibration and noise damper for wheels of rail vehicles, to which wheels it is fastened with screws, pins, or rivets, which comprises of at least two segments formed by a supporting part (2) for gripping to the wheel (1), a pushing part (3) and a damping part (4), where the pushing part (3) is connected by means of bolts (9) with the supporting part (2) and is formed either by a single metal or composite element, or it is directly integral part of the damping part (4) and where the damping part (4) is formed in the direction away from the wheel (1) rim of a strain pliable metal or composite layer (4a), of a viscoelastic layer (4b), and
(Continued)

possibly of other metal or composite layer (4c), wherein in compressed state the damping part (4) is placed between the pushing part (3) and the wheel (1) rim. Preferably, the supporting part (2) is formed of metal or composite material. Also preferable is the embodiment when thermally insulating pads (5) are arranged between the supporting part (2) and the wheel (1) and/or between the fastening material for attaching the supporting part (2) to the wheel (1) and the wheel (1). The viscoelastic layer (4b) in the damping part (4) can comprise glass fibers and/or ceramic fibers and can be provided with a set of holes (4d) and/or radial cuts (4e) of various shape, wherein their number, size and arrangement are different for individual designs of the dampers in relevance to their shape.

7 Claims, 5 Drawing Sheets (51) Int. Cl.
B60B 17/00 (2006.01)
F16F 15/32 (2006.01)
F16F 15/34 (2006.01)

(52) U.S. Cl.
CPC .......... *F16F 15/129* (2013.01); *F16F 15/324* (2013.01); *F16F 15/345* (2013.01); *B60B 2900/131* (2013.01); *B60B 2900/133* (2013.01); *B60Y 2200/30* (2013.01); *F16F 2230/48* (2013.01)

(58) Field of Classification Search
USPC ........................................................ 188/371
See application file for complete search history.

(56) References Cited

U.S. PATENT DOCUMENTS

| 3,530,960 | A | * | 9/1970 | Gronemann | .......... F16D 65/124 188/218 XL |
| 4,353,586 | A | * | 10/1982 | Raquet | ................ B60B 17/0017 105/452 |
| 4,392,681 | A | * | 7/1983 | Raquet | .................... F16F 7/108 105/452 |
| 4,496,183 | A | * | 1/1985 | Kasper | ................ B60B 17/0017 105/452 |
| 4,635,990 | A | * | 1/1987 | Golubenko | ......... B60B 17/0041 152/43 |
| 6,565,158 | B2 | * | 5/2003 | Seimiya | .................... B60B 3/02 181/207 |
| 8,939,488 | B2 | * | 1/2015 | Wirth | ...................... F16D 65/12 188/33 |
| 2006/0021542 | A1 | * | 2/2006 | Bieker | ................ B60B 17/0006 105/209 |
| 2006/0202400 | A1 | * | 9/2006 | Fitzgerald | ............. F16F 1/3732 267/293 |
| 2010/0141026 | A1 | * | 6/2010 | Angot | ................ B62D 55/0966 305/137 |

FOREIGN PATENT DOCUMENTS

EP 1 693 789 A1 8/2006
JP S58 116202 7/1983

OTHER PUBLICATIONS

Written Opinion dated Apr. 1, 2015 issued in corresponding International patent application No. PCT/CZ2014/000116.

* cited by examiner

VIBRATION AND NOISE DAMPER

CROSS REFERENCE TO RELATED APPLICATIONS

The present application is a 35 U.S.C. § 371 National Phase conversion of PCT/CZ2014/000116, filed Oct. 17, 2014, which claims benefit of Czech Republic Application No. PV2013-798, filed Oct. 17, 2013, the disclosure of which is incorporated herein by reference.

FIELD OF THE INVENTION

The present technical solution relates to a design of a vibration and noise damper applied in technical systems, e. g. in rotating discs, gear wheels etc., however, particularly in wheels of rail vehicles.

BACKGROUND OF THE INVENTION

When driving a rail vehicle, vibrations and the subsequent emission of acoustic energy in the form of acoustic waves occur due to dynamic effects in contact of a wheel with a rail. In the audible frequency range, we call these waves as sound. If this sound is unwanted, it is called noise.

To reduce vibration and noise, various passive damping elements, generally known as dampers, are applied in the rail wheels, which are connected with the wheel by means of screws, rivets, adhesive bonding, vulcanization, spacer elements and the like.

So far, various types of dampers have been applied to the rail wheels. Dampers of annular shape are known, which can divided further by a set of cuts into more parts, wherein these parts may be partially divided further by a set of cuts. The so made dampers are disclosed for example in documents FR 2,569,271 or U.S. Pat. No. 5,734,133. Typically, such dampers comprise one or more layers of metal sheet and a damping material. Mounting of the wheel dampers to a wheel is realized either by means of bolted connections via through holes in the wheel, in its reinforced area between the rim and the plate parts of the wheel or the dampers are mounted via additional fastening elements to a shaped groove of the wheel rim.

A disadvantage of these dampers, mounted to the rim part of the wheel, is that the additional fastening elements, attached, for example, through a shaped groove or through flexible spacer members in the wheel, must ensure a very good transmission of vibrations from the wheel rim to the damper. If the quality of the vibration transmission decreases, the efficacy of the damper decreases simultaneously. So, these dampers are not very efficient in wheels, in which the dominantly oscillating part is the rim one. Due to the additional fastening elements, the price of such solutions is growing. A disadvantage of a damper mounted to the wheel rim, in which threaded parts are made, is also that for security reasons this solution is applicable particularly only in the rubber-sprung wheels. In the dampers, which are divided into multiple parts, wherein, there are gaps between the individual parts, it occurs that the larger are the gaps, the less the damper prevents the passage of sound waves. Another disadvantage of these dampers is that to reach sufficient damping, in the critical and higher frequency of the damper an effective emission of the acoustic energy by the damper itself must not take place, what depends on the geometry and material composition of the damper and represents a certain limiting factor for the construction of a damper.

Also, hitherto, steel rings, typically of circular or rectangular cross section, inserted into the circumferential grooves at the inner diameter of the wheel rim, have been applied as a shock absorbers in certain railway wheels. A design of such damping steel ring of circular cross-section is shown, for example, in the document GB 445,124. Usually, fixing of the ring end portions is made of a welded joint. These steel rings reduce vibration level by dry friction in contact with the groove of the wheel rim.

A disadvantage of the steel rings as dampers is that the damping effect is closely related with the bracing of the rings and thus with the contact circumstances with the wheel at their periphery, and subsequently with the amount of energy loss by friction during the oscillation of the wheel. It is technologically complicated to ensure optimal bracing of the rings in this design. In addition, damping by rings will begin to show up more significantly only when the own frequency of the wheel is higher.

Also, the resonantly tuned dampers, mounted on the board or the ring parts of the wheel, used to reduce vibration levels of a wheel for the selected shapes of wheel vibrations, are known and have been applied in practice. A design of such dampers is disclosed for example in the GB document No. 293,657.

A disadvantage of the resonantly tuned dampers is that their efficacy depends on accurate frequency tuning to reach the own frequency of the wheel and the suppressed vibration shape corresponding to it. The wheel wears during operation causing a change in its own frequency, and thus detuning of the damper takes place and its effectiveness is reduced. In addition, the wheel is driven over a wide frequency band, which band includes more than one or two major forms of oscillations of the wheel, on which the resonance damper is tuned, what can significantly reduce the effect of the damper. Because of the rolling of the wheel, splitting of the own frequencies for all shapes of vibrations takes place, with one or more nodal diameters and formation of running waves in the circumferential direction of the wheel takes place. This prevents accurate tuning of the resonant frequency of the damper.

Up to now, shock absorbers, which are glued or vulcanized on the surface of the wheel, were also applied in the operation of railway wheels. A design of such shock absorber is disclosed, for example, in EP 0 872 358 A1. Typically, dampers consist of a layer of viscoelastic material and a metal layer in the direction from the wheel surface. These dampers absorb mechanical energy produced by oscillation of a wheel, particularly by the shear deformation of the viscoelastic material.

A disadvantage of these dampers, which are glued or vulcanized to the surface of the wheel, is that the damper must be well connected with the entire contact area with the wheel, what is technologically rather challenging. In case, the connection with the wheel is not flawless, there will be a decrease in the effectiveness of the damper. Because of the deformation stress in the contact area of the damper with the wheel during operation, the connection may be partially disintegrated, what causes reducing of the effectiveness of the damping, or eventually, the damper may be ripped off the wheel. Also, the use of the damper only for the lifetime of the wheel is a limiting factor.

Also, multilayer sandwiched dampers consisting of mutually interspersed thin layers of metal sheet and damping material are applied to the damping on the railway wheels. Designs of such dampers are disclosed for example in EP 0 047 385 B1 and DE 31 19 960. For example, the dampers are attached using a shaped groove in the wheel rim, through connecting elements by means of bolted joints, or they are clamped over the threaded portions by means of bolted joints in the transition zone of the plate to the rim. The damping principle consists in the energy dissipation by shear deformation of thin layers of the damping material, which energy is produced by cyclic bending of the damper during the wheel vibration.

A disadvantage of the multilayer sandwiched dampers, mounted beneath the wheel rim, is that they are less effective when the rim of the wheel oscillates dominantly. In attaching of dampers over the shaped groove in the rim of the wheel, it is difficult to ensure good contact of dampers, or fasteners eventually, with the wheel due to manufacturing tolerances of the wheel rim diameter. If a good contact of the dampers with the wheel, and thereby transmission of the vibrations into the dampers, is not ensured then decrease in the effectiveness of the damping takes place. Also, production of the shaped groove in the wheel rim is technologically demanding, leading to an increase in the costs in the case this solution is adopted. During operation, pushing away of the contact surfaces of dampers may also occur, leading to a decrease in the efficiency of the damping.

In some cases, the support members were applied on the wheels for attachment of the dampers, which members are fastened to the wheel by elastic bracing of the end portions of these members. The dampers are attached to the supporting members by bolts. A design of the attachment of the support members and the dampers is disclosed for example in the document DE 198 32 266.

A disadvantage of this solution of the damper attachment is that with regard to the manufacturing tolerances of the wheel a good contact of the bearing members with the wheel is not ensured, what results in reducing of the vibration transmission from the wheel to the dampers, and thereby also in reducing of the damper effectiveness. Also, considering the directions and points of action of the expansion forces from the resilient members and the relatively high bending stiffness of the support members, there will not be any ideal abutment of the support members around the whole circumferential contact with the wheel, what again leads to a reduction in the transmission of vibrations from the wheel to the dampers and to the subsequent decrease in the effectiveness of the dampers. A disadvantage, appears to be also the relatively high manufacturing costs of the support members.

SUMMARY OF THE INVENTION

These deficiencies are largely eliminated by a vibration and noise damper, which is particularly suitable for wheels of rail vehicles, to which wheels it is fastened with screws, pins, or rivets evenly, which comprises of at least two segments formed by a supporting part for gripping to the wheel, a pushing part, and a damping part, which consists in that the pushing part is connected by means of bolts with the supporting part and is formed either by a single metal or composite element, or it is integral part of the damping part, wherein in the compressed state the damping part is placed between the pushing part and the wheel rim.

Here, it is preferred if the supporting part of the damper is formed of metal or composite material.

Another preferred embodiment is when thermally insulating pads are arranged between the supporting part and the wheel and/or between the fastening material for attaching the supporting part to the wheel and the wheel.

Preferably, a damper can be used having a viscoelastic layer in the damping part comprising glass fibres and/or ceramic fibres.

Preferably, the viscoelastic layer in the damping part can be provided with a set of holes of various shape. Their number, size and arrangement are different for individual designs of the dampers in relevance to their shape.

Preferably, the damping part can be provided also with a system of radial cuts.

An also preferable solution is if the damping part is joined with the push part by means of springs and/or pins.

An advantage of a vibration and noise damper according to the invention is that the preloading of the damping part with the aim to maximize damping by friction in the contact with the wheel is realized by pressing the damping part in the radial direction using bolts, which are placed in the supporting part of the damper. By pressing the damping part its pliable metal or composite layer simultaneously abuts directly on the wheel.

This ensures good and stable transmission of vibrations from the wheel to the damping part of the damper. Subsequently, the transferred mechanical energy generated by vibration of the wheel is thwarted by deformation of the viscoelastic layer in the damping part. To damp the wheel vibrations, the dampers deliberately use a combination of damping by dry friction in contact of the deformation flexible metal or composite layer with the wheel and simultaneously damping by deformation of the viscoelastic layers of the dampers, which is caused by vibrations of the wheel i.e. the transformation of mechanical energy into thermal energy. The contact proportions between the dampers and the wheel including the geometry of individual parts of the dampers are determined on the base of measurements and calculations, so that the resulting damping effect on the wheel is maximized. As these dampers have ensured a good and stable contact with the wheel during the operation of wheel, and also with regard to the manufacturing tolerance of the inner diameter of the wheel rim, there is not any decrease of the damper effectiveness due to loss of transmission of vibrations from the wheel to the dampers. Where the absorbing part comprises glass or ceramic fibres, the internal damping in these parts increases. An apparent advantage is also that it is not necessary to produce the technologically demanding and expensive shaped grooves in the rim part of the wheel to mount the dampers to the wheel. A significant advantage is the so designed dampers is that they can be applied in a new wheel at the end of life of the original wheel.

BRIEF DESCRIPTION OF THE DRAWINGS

The technical solution of the dampers is illustrated in greater detail in FIGS. 1 to 5. The Figures show different designs of the vibration and noise damper.

EXAMPLES OF EMBODIMENTS

Example 1

Figure 1:
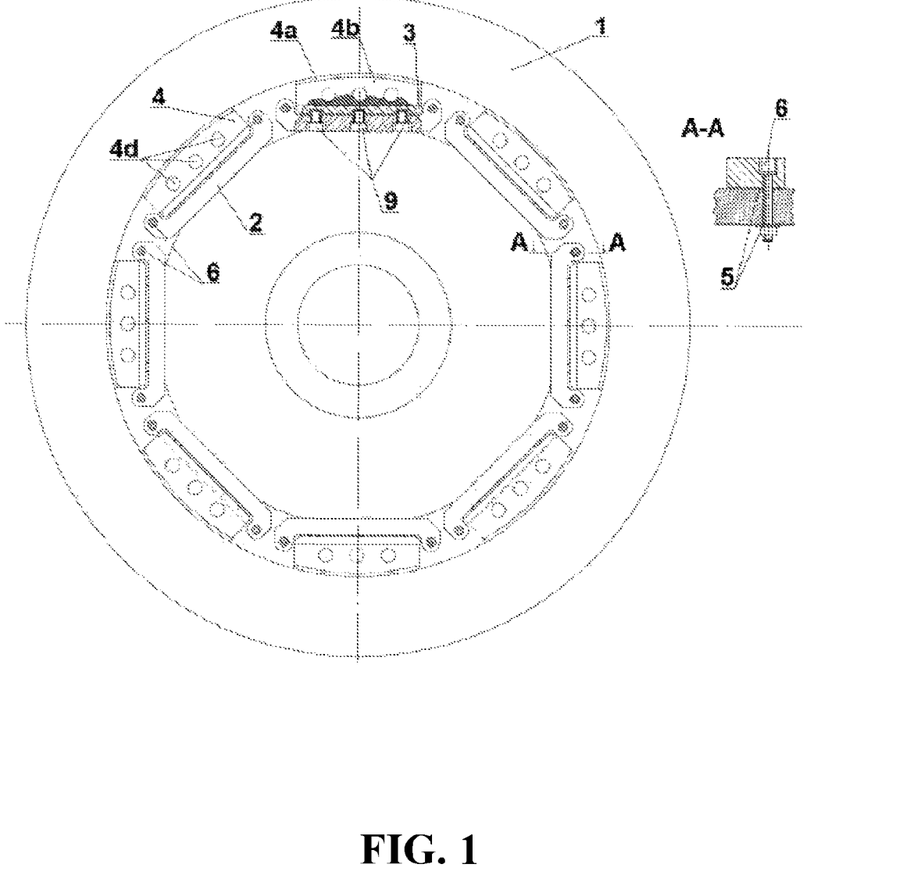

The exemplary embodiment of a noise and vibration damper for the wheels of rail vehicles according to FIG. 1 comprises a supporting part 2, a damping part 4, the first coupling bolts 6, the thermally insulating pads 5, and the second coupling bolts 9.

The damping part 4 comprises a strain pliable first metal layer 4a, a viscoelastic layer 4b, a second metal layer 3, and is provided with holes 4d. Eight segments of the damper are placed evenly on the circumference of the wheel 1.

The supporting part 2 is formed of metallic material and is joined with the wheel via through holes in the wheel 1 by means of the first coupling bolts 6.

The second metal layer 3 of the damping part 4 fulfils also the function of the pushing part of the damper.

The supporting part 2 and the first coupling bolts 6 are thermally insulated from the wheel 1 by thermally insulating pads 5.

The individual layers of the damping part 4 are joined by gluing.

The viscoelastic layer 4b comprises ceramic fibres.

The preloading of the damping, part 4 with the aim to maximize damping by friction in the contact of the strain pliable first metal layer 4a with the rim of wheel 1 is realized by deformation pressing by means of the second coupling bolts 9.

By pressing of the damping part 4 the strain pliable first metal layer 4a abuts on the rim of wheel 1.

Example 2

Figure 2:
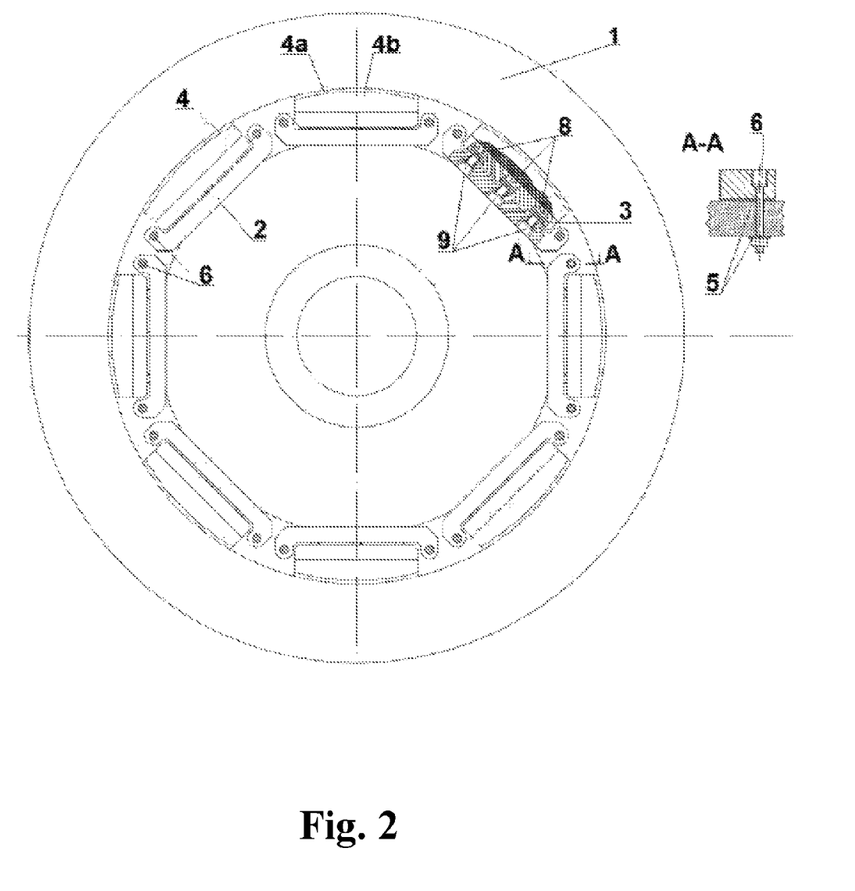

The exemplary embodiment of a noise and vibration damper for the wheels of rail vehicles according to FIG. 2 comprises a supporting part 2, a damping part 4, the first coupling bolts 6, the thermally insulating pads 5, the second coupling bolts 9, and the springs 8.

The damping part 4 comprises a strain pliable first metal layer 4a, a viscoelastic layer 4b, and a second metal layer 3. Eight segments of the damper are placed evenly on the circumference of the wheel 1.

The supporting part 2 is formed of metallic material and is joined with the wheel via through holes in the wheel 1 by means of the first coupling bolts 6.

The second metal layer 3 of the damping part 4 fulfils also the function of the pushing part of the damper.

The supporting part 2 and the first coupling bolts 6 are thermally insulated from the wheel 1 by thermally insulating pads 5.

The individual layers of the damping part 4 are joined by vulcanization.

The viscoelastic layer 4b comprises glass and ceramic fibres.

The preloading of the damping part 4 with the aim to maximize damping by friction in the contact of the strain pliable first metal layer 4a with the rim of wheel 1 is realized by deformation pressing by means of the second coupling bolts 9 and by means of springs 8, which are situated between the second coupling bolts 9 and the second metal layer 3 of the damping part 4, wherein the preloading of the springs 8 is set by their pressing.

By pressing of the damping part 4 the strain pliable first metal layer 4a abuts on the rim of wheel 1.

Example 3

Figure 3:
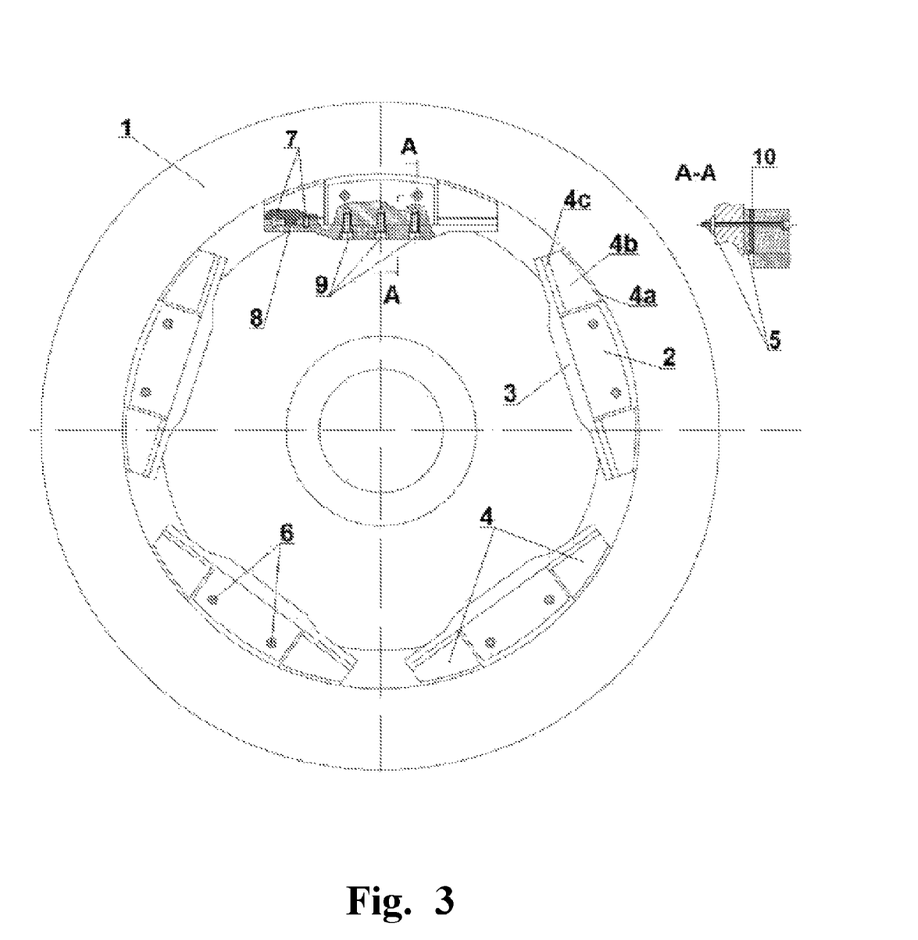

The exemplary embodiment of a noise and vibration damper for the wheels of rail vehicles according to FIG. 3 comprises a supporting part 2, a pushing part 3, damping parts 4, the first coupling bolts 6, the thermally insulating pads 5, the second coupling bolts 9, the pins 7, the springs 8, and the damping layer 10.

The damping part 4 comprises a strain pliable first metal layer 4a, a viscoelastic layer 4b, and a second metal layer 4c. Five segments of the damper are placed evenly on the circumference of the wheel 1.

The supporting part 2 is formed of composite material and is joined with the wheel 1 via through holes in the wheel 1 by means of the first coupling bolts 6.

A damping layer 10 of viscoelastic material is inserted between the supporting part 2 and the wheel 1.

The supporting part 2 and the first coupling bolts 6 are thermally insulated from the wheel 1 by thermally insulating pads 5.

The individual layers of the damping part 4 are joined by gluing.

The viscoelastic layer 4b and the damping layer 10 comprise glass fibres.

The damping part 4 is connected with the pushing part 3 by means of pins 7 and springs 8. The pushing part 3 is connected with the supporting part 2 by means of the second coupling bolts 9. The pushing part 3 provides binding and pushing of the damping part 4 to the rim of wheel 1 with regard to maximizing of damping by friction in contact of the strain pliable first metal layer 4a with the rim of wheel 1.

By pressing of the damping part 4 the strain pliable first metal layer 4a abuts on the rim of wheel 1.

Example 4

Figure 4:
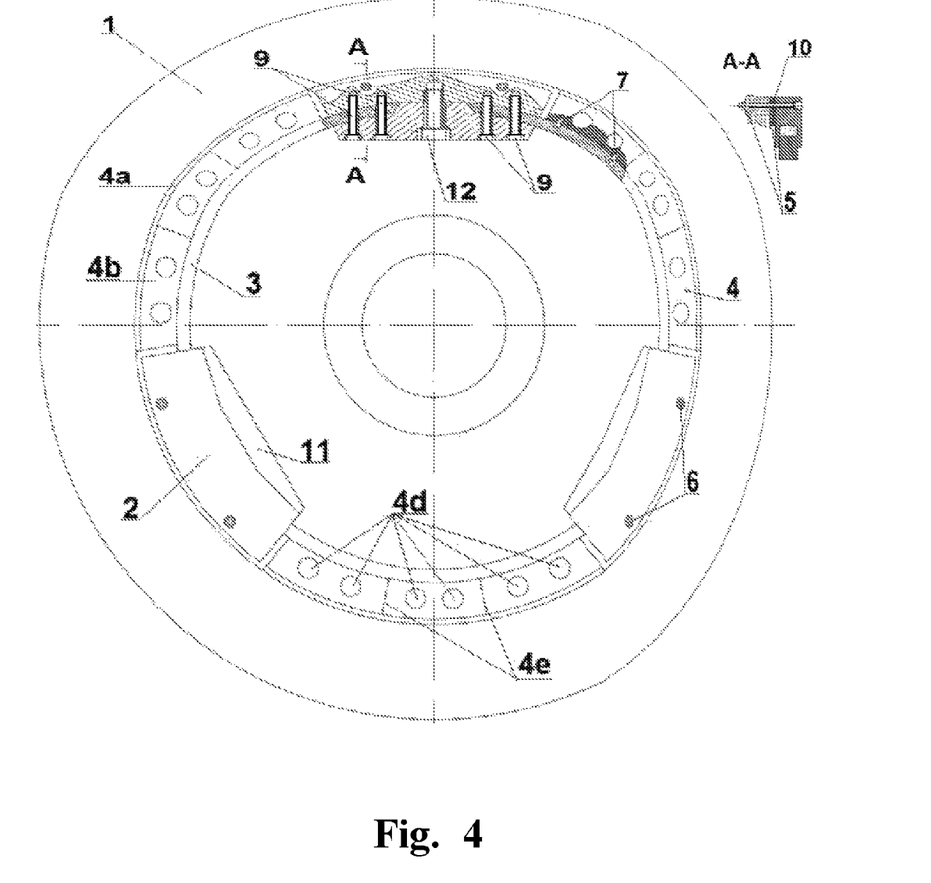
Figure 5:
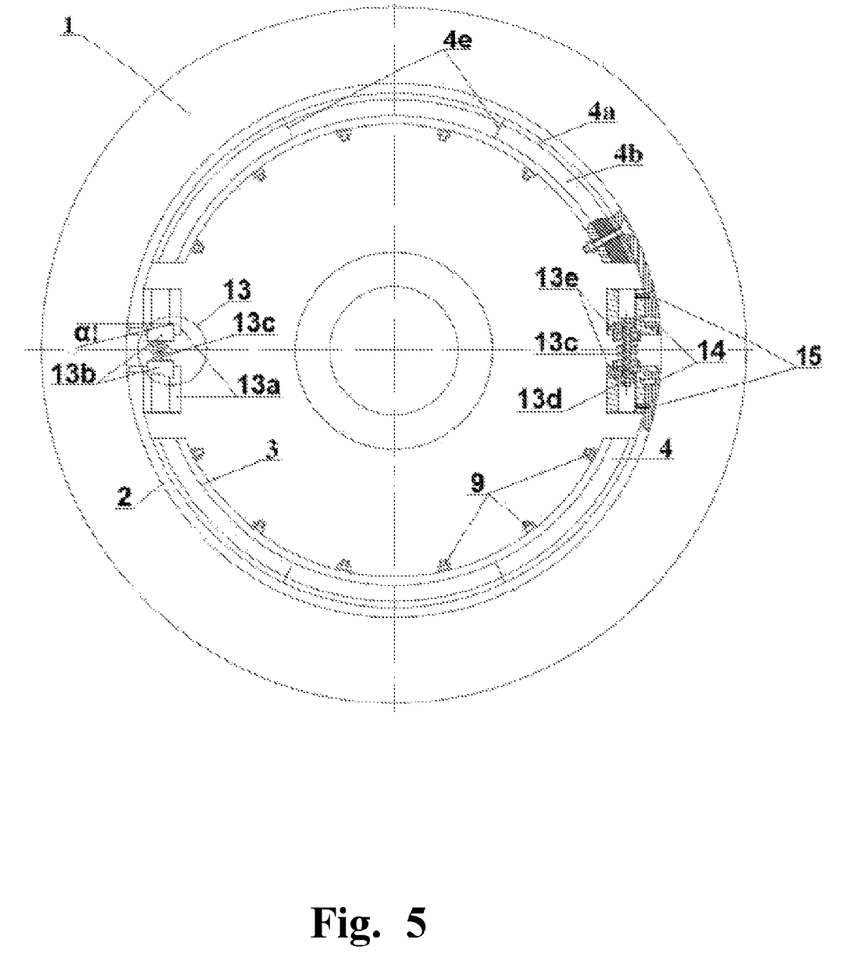

The exemplary embodiment of a noise and vibration damper for the wheels of rail vehicles according to FIG. 4 comprises a supporting part 2, a pushing or damping parts 4, mounting parts 11, the first coupling bolts 6, the thermally insulating pads 5, the second coupling bolts and the pins and the damping layer 10.

The damping part 4 comprises a strain pliable first metal layer 4a, a viscoelastic layer 4b, and is provided with holes 4d and radial cuts 4e. Three segments of the damper are placed evenly on the circumference of the wheel 1.

The supporting part 2 is formed of metallic material and is joined with the wheel 1 via through holes in the wheel 1 by means of the first coupling bolts 6.

A damping layer 10 of viscoelastic material is inserted between the supporting part 2 and the wheel 1.

The supporting part 2 and the first coupling bolts 6 are thermally insulated from the wheel 1 by thermally insulating pads 5.

The individual layers of the damping part 4 are joined by vulcanization.

The viscoelastic layer 4b and the damping layer 10 comprise ceramic fibres.

The damping part 4 is connected with the pushing part 3 by means of pins 7. Displacement of the pushing part 3 in radial direction of the wheel is realized by means of the mounting part 11 which is connected with the supporting part 2 by means of the second coupling bolts 9 and 12. The pushing part provides binding and pushing of the damping part 4 to the rim of wheel 1 with regard to maximizing of damping by friction in contact of the strain pliable first metal layer 4a with the rim of wheel 1.

By pressing of the damping part 4 the strain pliable first metal layer 4a abuts on the rim of wheel 1.

INDUSTRIAL USE

The individual designs of embodiments of the vibration and noise dampers are intended to be used preferably for wheels of rail vehicles but may be used for example in rotating discs, gear wheels, etc.

The invention claimed is:

1. A vibration and noise damper configured for wheels of rail vehicles, to which wheels it is fastenable with screws, pins, or rivets, the vibration and noise damper comprising: at least two segments formed by a supporting part configured to grip a wheel rim, a pushing part radially movable toward a circumferential surface of the wheel rim when the supporting part grips the wheel rim, and a damping part arranged to be between the pushing part and the circumferential surface of the wheel rim when the damper grips the wheel rim, wherein the pushing part is directly integrated with the damping part, or is connected by means of bolts only with the supporting part, wherein the pushing part is formed either by a single metal element or by a composite element, wherein the damping part includes, arranged in a direction away from the circumferential surface of the wheel rim, a first, strain pliable, metal or composite layer, and a second, viscoelastic layer, wherein, the damping part is compressible relative to the supporting part when the supporting part grips the wheel rim and the pushing part is radially moved toward the circumferential surface of the wheel rim, and wherein, in a compressed state, the damping part presses closely and directly to the circumferential surface of the wheel rim against which the damping part is pushed by the pushing part.

2. The vibration and noise damper of claim 1, wherein thermally insulating pads are arranged between the supporting part and the wheel rim and/or between the fastening material for attaching the supporting part to the wheel rim and the wheel rim.

3. The vibration and noise damper of claim 1, wherein the second, viscoelastic layer in the damping part comprises glass fibres and/or ceramic fibres.

4. The vibration and noise damper of claim 1, wherein the second, viscoelastic layer in the damping part is provided with a set of holes.

5. The vibration and noise damper of claim 1, wherein the second, viscoelastic layer of the damping part is provided with a plurality of radial cuts.

6. The vibration and noise damper of claim 1, wherein the damping part further includes a third metal or composite layer.

7. The vibration and noise damper of claim 1, further comprising at least one bolt that is movable relative to the supporting part against the damping part to radially move the pushing part and compress the damping part when the supporting part grips the wheel rim.

* * * * *